United States Patent [19]

Gleason et al.

[11] 3,982,569

[45] Sept. 28, 1976

[54] TIRE FILLING APPARATUS AND METHOD

[75] Inventors: Paul W. Gleason, Minneapolis; Kenneth E. Lehrke, Osseo, both of Minn.

[73] Assignee: Graco Inc., Minneapolis, Minn.

[22] Filed: June 26, 1975

[21] Appl. No.: 590,596

[52] U.S. Cl. ............................ 141/5; 141/59; 141/198; 141/330
[51] Int. Cl.² ........................................ B65B 3/04
[58] Field of Search ........................ 141/1–7, 141/52, 59, 60, 66, 198, 19, 329, 330, 38; 152/415

[56] References Cited
UNITED STATES PATENTS 2,652,181    9/1953    Rupp ................................ 141/38

*Primary Examiner*—Houston S. Bell, Jr.
*Attorney, Agent, or Firm*—Paul L. Sjoquist

[57] ABSTRACT

Apparatus is disclosed for filling a pneumatic tire with fluid which solidifies on curing, including a fluid pumping connection to the tire air valve, a tire penetrating connection having an air relief passage to permit trapped air to escape from the tire, and a sensing and safety circuit for stopping the filling operation whenever the tire becomes filled with fluid or whenever the air escape mechanism ceases operating.

13 Claims, 5 Drawing Figures

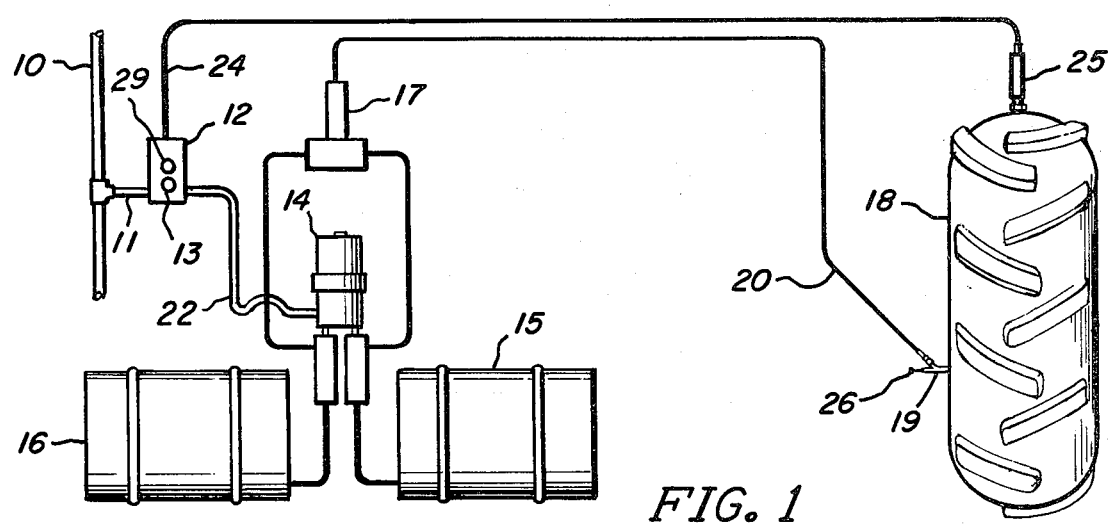
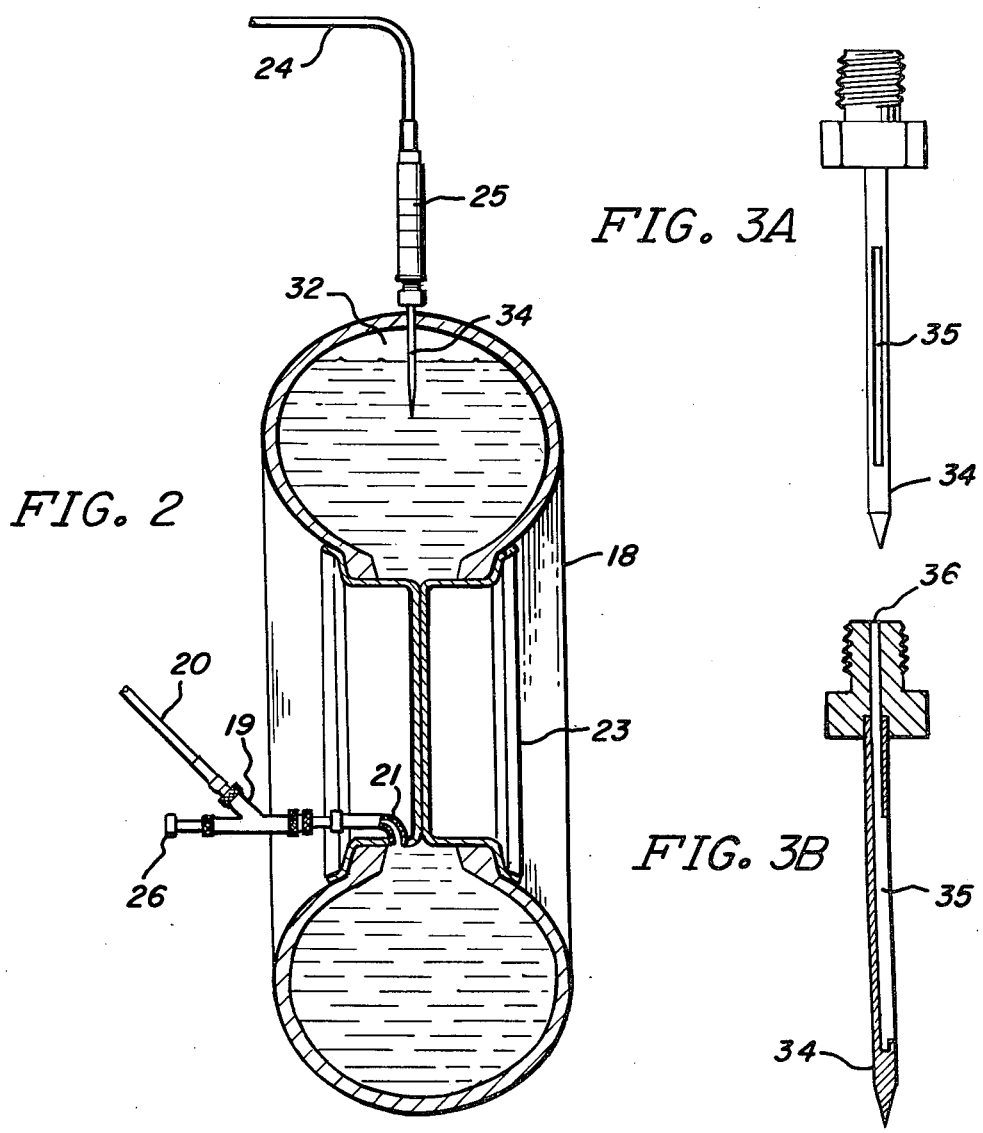
FIG. 1
FIG. 2
FIG. 3A
FIG. 3B 3,982,569

TIRE FILLING APPARATUS AND METHOD

BACKGROUND OF THE INVENTION

Pneumatic tires, particularly those used on vehicles in industrial, farming, and construction projects, are susceptible to punctures which require that the vehicle be taken out of service for so long as is required to repair the tire. These vehicle tires are generally subjected to hostile terrain and severe loading conditions which greatly increase the liklihood of puncturing. Furthermore, since these vehicles are generally driven at slow operating speeds the usual advantages offered by pneumatic tires by way of improved vehicle handling and operating efficiency are not available.

In recent years, fluid elastomers such as polyurethane have been developed for injecting into pneumatic tires to create a solid puncture proof tire for wheels used in applications as described above. Improved elastomers, including plural component fluids have been developed which, when hardened, provide a solid material having a low specific gravity and a great many micron-sized hollow cavities. Such a material is described in U.S. Pat. No. 3,866,651, issued Feb. 18, 1975. Another such material is described in U.S. Pat. No. 3,866,652, issued Feb. 18, 1975. These materials, and other similar materials which may be injected into a pneumatic tire in a fluid state and which solidify upon curing, may be used with the present invention, which comprises a method and apparatus for injecting such fluids.

SUMMARY OF THE INVENTION

The present invention comprises a fluid pumping system for developing a suitable fluid pressure for injecting into a pneumatic tire, and a connection means for coupling the fluid pumping system to the tire valve core. The invention further comprises a hollow needle for inserting into the tire at a point diametrically opposite from the valve core, which hollow needle is connected to a pneumatic circuit for sensing the release of air from the tire as fluid is pumped into it, and for controlling the operation of the fluid pump whenever the sensed air flow ceases. The invention includes pneumatic circuit safeguards for disconnecting the fluid pumping system in the event the air relief passage becomes blocked, to avoid the danger of over filling the tire with pumped fluid and therefore to avoid the danger of explosion of the tire casing due to such overfill.

BRIEF DESCRIPTION OF THE DRAWINGS

A preferred embodiment of the present invention is shown in the attached drawings, in which:

FIG. 1 illustrates in schematic view the invention in an operating configuration;

FIG. 2 illustrates a cross-section of the tire filling and air relief apparatus;

FIG. 3A illustrates the sensing needle;

FIG. 3B illustrates the sensing needle in cross-section; and

DESCRIPTION OF THE PREFERRED EMBODIMENT

Figure 4:
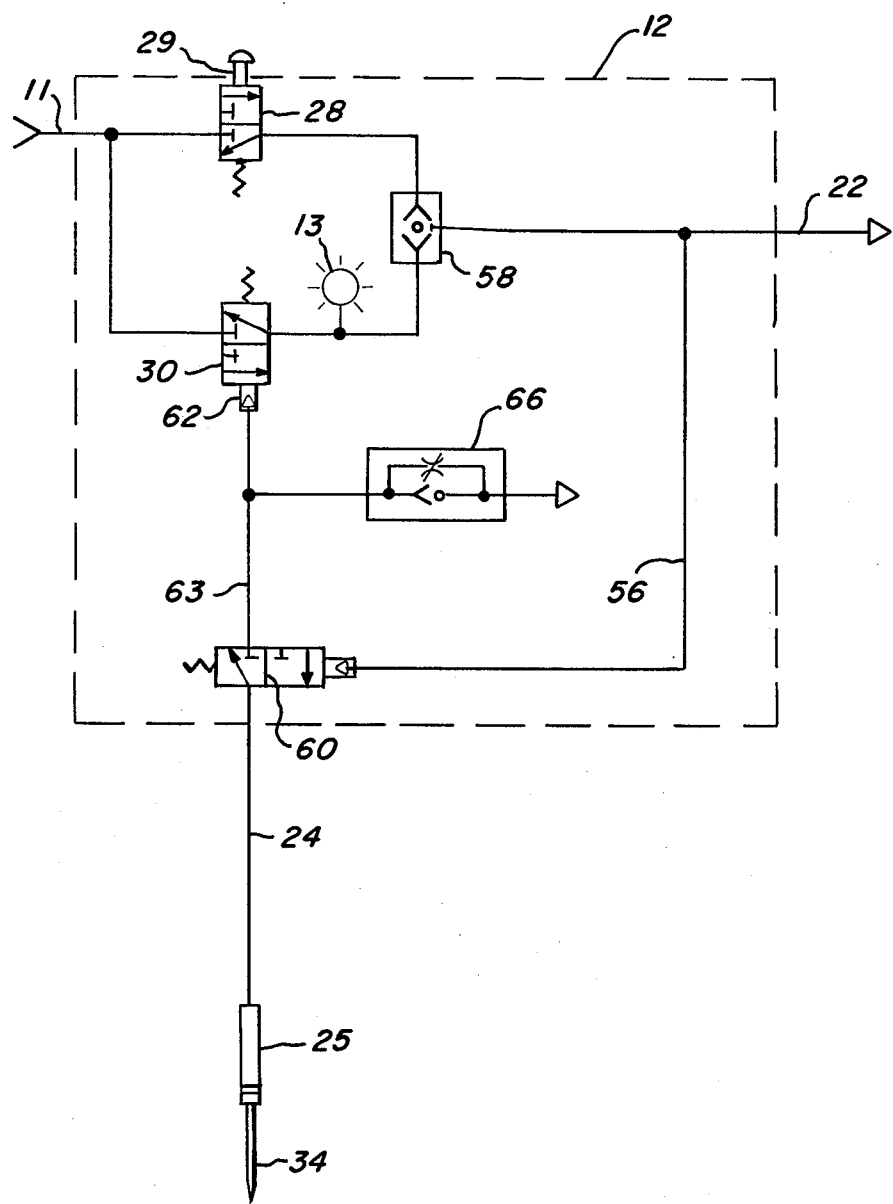
FIG. 4 is a schematic diagram of the pneumatic air circuit associated with the invention.

FIG. 1 illustrates the invention in schematic view. An air line 10 is connected to a source of compressed air, preferably in the range of 80–100 pounds per square inch (p.s.i.). A tap 11 connects the air line 10 into a control box 12 to be hereinafter described in detail. Control box 12 has a start switch 29 for overall control of the tire filling operation. An indicator 13 is operated by air flow through control box 12 to provide a visual indication that the tire filling operation is proceeding. An air hose 22 connects between control box 12 and a fluid pump 14. Pump 14 is preferably an air-operated pump which may be connected into fluid containers 15 and 16 and operated by means of the compressed air supply. A fluid line 20 connects pump 14 with tire valve 21 through a coupling 19. Tire valve 21 is a conventional type valve mounted through the rim of tire 18. A sensor 25, including a hollow needle, is attached to tire 18 at a point diametrically opposite from tire valve 21. Sensor 25 has a sensor line 24 connecting it with control box 12.

Fluid containers 15 and 16 may contain liquid chemical tire filling components which, when mixed and cured, solidify into a resilient but solid material. These fluids are separately pumped by pump 14 into a mixer 17 which thoroughly mixes the two components together. The air operated pump which may be used with the invention is a commercially available item such as the "Monark" pump manufactured and sold by the assignee of the present invention. Similarly, the mixer may be obtained commercially and the present invention assignee's Model 503-184 Removable Element Mixer may be used for this purpose.

The normal operation of the apparatus is instituted after it is set up as illustrated in FIG. 1. The start switch 13 is activated, which enables compressed air to flow through air hose 22 to operate pump 14. Fluid is delivered through fluid line 20, through tire valve stem 21 into the interior of tire 18. As the tire becomes filled air entrapped within the tire is forced out through sensor 25 and is conveyed via sensor line 24 back to control box 12. When the tire filling operation is completed, no further air flow occurs through sensor line 24 and control box 12 generates a signal to automatically stop the operation of the apparatus by disconnecting the air supply to hose 22.

FIG. 2 illustrates the tire filling and sensing apparatus in cross section view. The tire 18 is mounted on a rim 23 in a conventional manner, and tire valve stem 21 is connected to a coupling 19 which has attached thereto a fluid line 20. Coupling 19 has a valve core removal rod 26 which enables the tire valve core to be threaded into or out of the tire valve stem 21 to provide a free flow path for fluid line 20.

FIG. 2 pictorially illustrates tire 18 as being partially filled with fluid, but having an air space 32 near the upper inside surface of the tire. Needle 34 is inserted through the tire wall to protrude into the tire interior, and air entrapped in air space 32 escapes through an opening in needle 34 to sensor 25 and sensor line 24. Entrapped air will continue to escape in this manner until the tire interior has been completely filled with fluid and air space 32 is reduced to zero.

FIG. 3A illustrates an expanded view of needle 34. Needle 34 is typically about 4 inches in length, and has an elongated slot 35 running substantially along at least half its length, and communicating with a central hollow passage in the needle.

FIG. 3B illustrates in cross-sectional view another view of needle 34, particularly showing the relationship between slot 35 and central passage 36. For a 4 inch length of needle 34, the needle diameter should be approximately ⅛ inch, and slot 35 should be about 0.06 inches in width for a length of at least 2 inches along the edge of needle 34. These dimensions assure that the needle will penetrate nearly all commercially available tires and will provide a sufficient entrapped air relief passage for the operation of the invention.

FIG. 4 illustrates the pneumatic circuit controls utilized in the invention. The compressed air line tap 11 is connected into control box 12, where it provides a pressurized air source to push button air valve 28 and to a pilot valve 30. Pilot valve 30 is normally closed to the flow-through of pressurized air from tap 11, but opens upon sensing a pressure at connection 62. A valve suitable for this purpose is Model 125 AH. manufactured by Humphrey Products Co., Kalamazoo, Michigan. Push button valve 28 is normally closed, but may be manually opened by depressing push button 29 to allow pressurized air to flow to shuttle valve 58. Shuttle valve 58 passes air flow out of control box 12 via air line 22 to operate pump 14 and thereby fill the tire. Shuttle valve 58 and push button valve 28 are commercially available devices, such as Model 5125 and Model 31P, respectively, manufactured by the aforementioned Humphrey Products Co.

Shuttle valve 58 is also connected to pilot valve 60 via line 56, where it causes pilot valve 60 to open and thereby provide a connection from sensor line 24 to pilot valve 30 and to flow control 66. Pilot valve 60 is a commercially available pilot valve similar to pilot valve 30, and flow control 66 may be obtained commercially from a source such as Mead Fluid Dynamics, Chicago, Illinois, under model designation MF1-12. Flow control 66 functions to leak a predetermined air flow rate to the atmosphere through a restricted orifice, and thereby prevents a pressure accumulation from developing in air line 63.

Sensor line 24 is connected to sensor 25 as hereinbefore described. Air flow through sensor 25 is coupled via pilot valve 60 to pilot valve 30, connection 62, where it causes pilot valve 30 to open and thereby provides an air flow path from tap 11 to shuttle valve 58. Once an air flow path has been created from tap 11 through pilot valve 30, push button 29 may be released and air will continue to flow through air line 22. Air flow through pilot valve 30 activates indicator 13 and provides a visual indication to the operator that entrapped air from the tire has activated valve 30 and the tire is filling automatically. This indicator permits the operator to release pushbutton 29 with knowledge that the tire will continue to fill with fluid.

In Operation, as the pump 14 continues to develop fluid pumping force to fill the tire, air entrapped within the tire continues to escape through needle 34. This air flow partially leaks to the atmosphere through flow control 66, but sufficient back pressure is maintained in air line 63 to hold pilot valve connection 62 in valve opening position. As soon as the tire becomes filled with fluid no further air flow occurs in sensor line 24 and pilot valve 30 therefore closes. This closes the pressurized air connection to shuttle valve 58 and air line 22, and shuts off pump 14 from further pumping action. At this point the tire filling operation is complete and needle 34 may be removed from the tire, the tire valve core may be replaced with rod 26, and coupling 19 may be disconnected from valve stem 21. After a suitable curing interval, the fluid pumped into the tire will solidify and will provide a solid volume entirely filling the inside of the tire cavity.

In the event the apparatus malfunctions during the filling operation, as for example in the event needle 34 should become plugged, air flow through sensor line 24 will immediately cease. When this happens, the back pressure developed in air line 63 quickly leaks to the atmosphere through flow control 66 and pilot valve 30 closes. This disconnects the pressurized air supply from air line 22 and air operated pump 14 immediately stops its pumping action. The apparatus thus operates in a fail safe mode, requiring positive air flow through sensor line 24 in order to maintain the pumping of fluid into the tire.

Of course, the automatic air shut off provisions described herein may be manually circumvented at any time by depressing push button 29. This permits compressed air from tap 11 to become coupled into shuttle valve 58 to operate fluid pump 14. This manual override feature may be utilized as a final "topping off" after sensor 25 has been removed from the tire. In this event, depressing push button 29 will enable additional fluid to be pumped into the tire until it leaks through the tire casing at the hole caused by the insertion of needle 34.

The preferred embodiment of the invention described herein may be used to provide a safe and efficient apparatus for the automatic filling of tires with fluid. The automatic shutoff provision enables the tire filling operation to be unattended, as the apparatus will discontinue pumping whenever the flow of entrapped air from the tire ceases.

What is claimed is:

1. A filling and control apparatus for pumping fluid into a tire mounted on a rim through the tire air valve and controlling the fluid fill by monitoring escaping air flow from the tire, comprising:
    a. means for pumping fluid into said tire, connectable to said air valve;
    b. a first manually actuable control valve for activating said means for pumping fluid;
    c. a second pressure actuable control valve for deactivating said means for pumping fluid, said second control valve having a pressure responsive actuating terminal;
    d. an air flow line having a hollow needle attached to one end, said needle being adaptable for inserting into said tire; and
    e. means for connecting said air flow line to said second pressure actuable control valve pressure responsive actuating terminal to deactivate said pumping means upon cessation of air flow through said air flow line.

2. The apparatus of claim 1, further comprising a pressure relief valve connected to said second control valve pressure responsive actuating terminal.

3. The apparatus of claim 2 wherein said means for pumping fluid into said tire further comprises an air operated pump.

4. The apparatus of claim 2, wherein said hollow needle further comprises a central passage extending from one end along a portion of the needle length, and an edge slot opening into said central passage for at least half of the needle length.

5. An apparatus for controlling a fluid pump connected in fluid filling operation to a tire valve, comprising
    a. means for sensing and transferring air entrapped in said tire, said means adaptable for projecting into the interior of the tire at a point diametrically opposite said tire valve;
b. air-operated valve means for controlling said pump, said valve means having a pressure responsive valve closure member connected to said means for sensing and transferring;
c. a relief valve having a restricted orifice connected to said pressure responsive valve closure member; and
d. manually operated valve means connected to said pump for manually activating said pump, said valve means being parallel-connected to said air-operated valve means.

6. The apparatus of claim 5 wherein said means for sensing and transferring further comprises an elongated hollow needle having an edge slot extending along at least half its length.

7. The apparatus of claim 6, further comprising means, interposed between said means for sensing and said pressure responsive valve closure member, for blocking said sensing and transferring means when said pump is inoperative.

8. A method of filling a tire with a fluid by introducing the fluid under pressure through the tire air valve stem, comprising the steps of:
a. positioning the tire substantially vertically with the air valve stem near the bottom;
b. inserting a hollow needle into the tire diametrically opposite the air valve stem;
c. pumping fluid into the tire;
d. relieving the air entrapped in the tire and monitoring the flow thereof through the hollow needle; and
e. stopping the further pumping of fluid into the tire due to the flow of entrapped air ceasing.

9. An apparatus for filling an interior tire volume with fluid and automatically stopping such filling when the fluid volume equals the interior tire volume, comprising
a. an air operated fluid pump coupled to a source of fluid and connected to the tire interior;
b. an air flow coupling connected into the interior of said tire;
c. a source of compressed air and an air actuable valve connected to said air operated fluid pump;
d. means for connecting said air flow coupling in actuating operation to said air actuable valve; and
e. a manually actuable valve connected to said source of compressed air and said air operated fluid pump.

10. The apparatus of claim 9 wherein said air flow coupling further comprises a needle having a hollow interior and a slotted length communicating with said hollow interior.

11. The apparatus of claim 10, further comprising an air bleeder valve connected to said air flow coupling.

12. A filling and control apparatus for operating an air actuated fluid pump for filling a tire with pumped fluid comprising
a. a source of compressed air;
b. a first pressure actuated valve connected between said source of compressed air and said air actuable fluid pump, said valve having a pressure responsive terminal;
c. a needle having a hollow interior and an opening through the side thereof to said interior, adaptable for insertion through said tire to permit at least a portion of said needle opening to communicate with the interior of said tire;
d. means for connecting said needle hollow interior to said first pressure actuated valve pressure responsive terminal, said means including a second pressure actuated valve having a pressure responsive terminal connected to said air actuated fluid pump; and
e. an air bleeder valve connected to said first pressure actuated valve pressure responsive terminal.

13. A filling and shut-off control apparatus for pumping fluid into a tire mounted on a rim through the tire air valve, comprising;
a. means for pumping fluid into said tire, connectable to said air valve, and including shut-off means for stopping fluid pumping;
b. a pressure actuable control valve connected to said shut-off means, said control valve having means for sensing air flow; and
c. an air flow line having a hollow needle attached to one end, said needle being adaptable for inserting into said tire, and said air flow line being connected to said pressure actuable control valve means for sensing air flow;
d. means for connecting said air flow line to said pressure actuable control value
whereby air flow from said tire controls the pumping of fluid into said tire.

* * * * *